Sept. 22, 1964 B. J. NORRIS 3,150,332
SECOND HARMONIS MODULATOR
Filed June 10, 1960
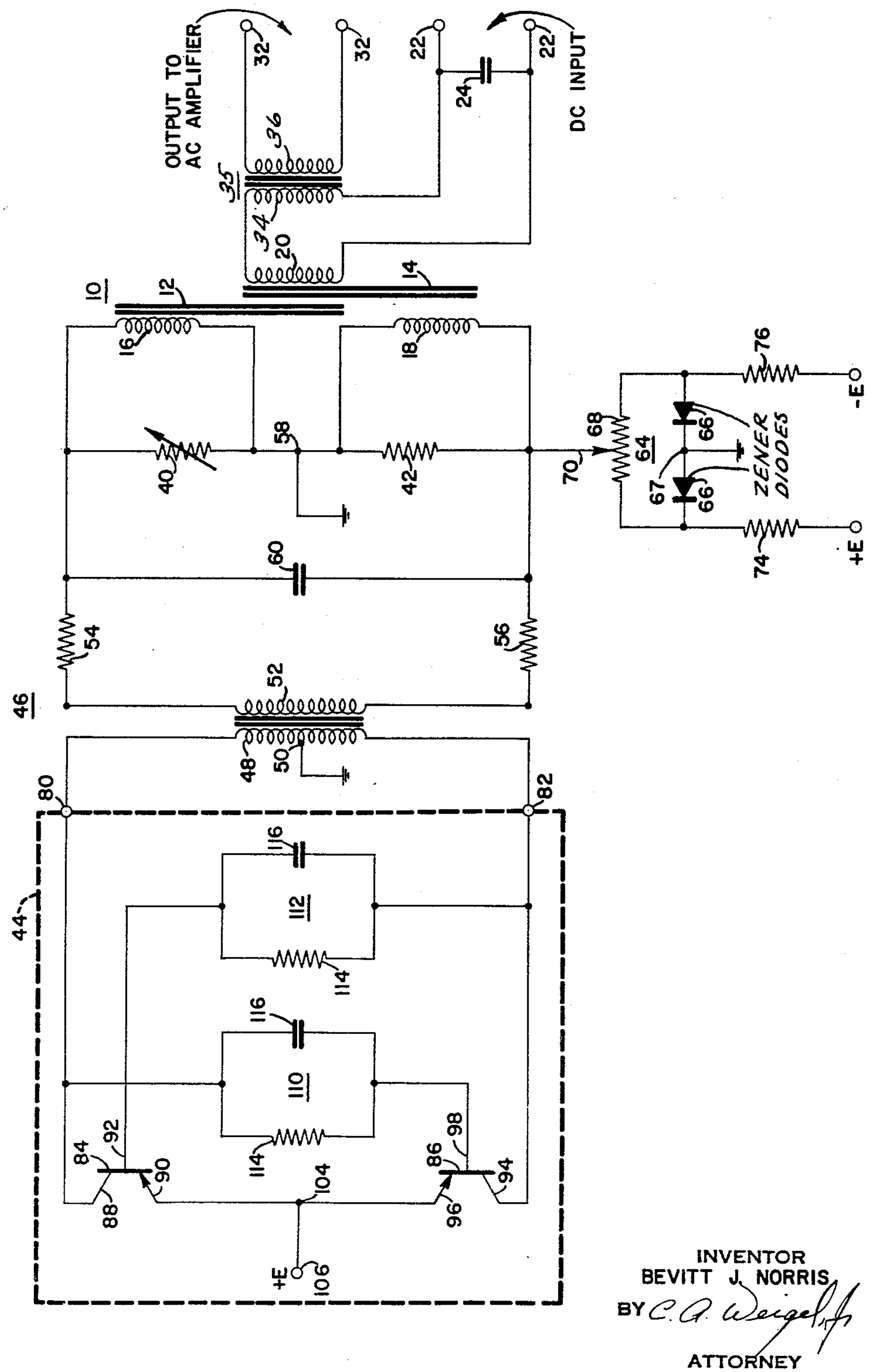
INVENTOR
BEVITT J. NORRIS
BY C. A. Weigel, Jr.
ATTORNEY United States Patent Office 3,150,332

Patented Sept. 22, 1964

3,150,332

SECOND HARMONIC MODULATOR

Bevitt J. Norris, La Jolla, Calif., assignor, by mesne assignments, to Control Data Corporation, Minneapolis, Minn., a corporation of Minnesota Filed June 10, 1960, Ser. No. 35,165
8 Claims. (Cl. 332—12)

This invention relates to a converter, and more particularly, to a novel drive for a second harmonic modulator. In a preferred embodiment of this invention, a second harmonic modulator, driven by a symmetrical rectangular wave drive signal, is used to convert a low level direct current (D.C.) input signal to an alternating current (A.C.) signal having a phase and amplitude related to the polarity and amplitude of the D.C. input signal.

Direct current amplifiers find wide use in the instrumentation and measurement field for converting transducer output signals, for example, to power levels that are sufficient to actuate low impedance loads such as meters and recorders. Since stable high gain D.C. amplifiers are difficult to attain, a converter is usually employed to convert the D.C. signal to an A.C. signal. The A.C. signal may then be amplified by conventional A.C. amplifiers without concern for the operating point stability required of D.C. amplifiers. After amplification, the A.C. signal may be reconverted to a D.C. signal at a high power level by appropriate demodulation techniques.

In the past, a number of means have been employed to convert the low level D.C. input signal to an A.C. signal. Some of these means include mechanical choppers, sampling switches, conversion type galvanometers, light choppers and magnetic devices. Unfortunately each of these conversion devices is subject to various limitations. For example, choppers and sampling switches rely on a mechanical contact which is subject to noise, mechanical wear and limited speed. Galvanometers are sensitive to shock, vibration, overload and are normally quite limited in their speed and response. Magnetic devices, on the other hand, have many desirable features which include no moving parts, passive elements, high sensitivity, relatively fast response and an ability to recover from overloads.

One such magnetic device that has been employed to convert low level D.C. signals to A.C. signals, is known as the magnetic modulator or second harmonic converter. Such converters, or modulators, are well known in the art. One such converter is described in an article by W. A. Rote entitled "A Magnetic Converter D.C. Amplifier," appearing on page 170 of Electronics, December 1953. As is described in the Rote article, any nonlinear element, symmetrical in shape about its origin and excited about its axis of symmetry, will only produce fundamental frequency or odd harmonics. However, if the axis of excitation of the symmetrical nonlinear element can be made to shift off the axis of symmetry by an external signal, even harmonics will be produced. It is this principle that forms a basis of operation for magnetic modulators. The even harmonics have a phase and amplitude that is determined by the direction (polarity) and magnitude of the disturbing influence which in this instance may be the low level D.C. signal to be converted and amplified.

Although many materials will satisfy this requirement, the nearly perfect symmetry of magnetic materials makes them particularly suitable for use in such converters. Further, any even harmonic of a fundamental frequency signal can be used as a signal carrier, but due to its greater strength, the second harmonic is normally chosen. Typically, as described in the Rote article, a second harmonic converter (or modulator) includes two cores having signal and excitation windings. The converter signal and excitation windings are arranged on the cores so that the flux established by the D.C. signal aids the instantaneous A.C. flux established by the excitation windings in one core while opposing it in the other.

Many different types of magnetic modulators have been available in the past. Unfortunately, they have generally been subject to several deficiencies. One of these deficiencies is that, in order to obtain a relatively good response time of the amplifier, a relatively high frequency A.C. exciting signal is required; for example, in the order of 25 kilocycles (kc.). To provide an exciting A.C. signal of this frequency, a considerable amount of power is required to drive the respective cores in the magnetic modulator. This power requirement has made it relatively difficult to employ small signal transistors as the driving means and thus generally vacuum tube drive circuits have been required. Further, it has been thought that only reasonably pure sign wave excitation currents could be used since the harmonics contained in the exciting wave form might appear in the output by transformer action. Pure sine wave signals are difficult to attain even with relatively expensive circuitry.

Accordingly, it is an object of this invention to overcome the disadvantages of the prior art.

Another object of this invention is to convert a D.C. low level input signal to the second harmonic of an exciting A.C. signal without the attendant disadvantages of the prior art.

In a preferred embodiment of this invention, a second harmonic magnetic modulator is designed to be driven by a substantially rectangular waveform having half cycles that are of essentially equal time duration and equal amplitude; i.e., a symmetrical rectangular waveform. The use of this symmetrical rectangular waveform drive, or exciting signal allows the design of a second harmonic modulator having a relatively good response time and yet permits the use of only small signal (low power) transistors in the drive circuitry therefor. The drive circuit itself includes means to balance out extraneous even harmonics by electrically modifying the symmetry of the magnetic cores used in the modulator.

Further advantages and features of this invention will become apparent upon consideration of the following description read in conjunction with the drawing wherein the sole figure is a schematic diagram of a second harmonic modulator and associated drive circuitry constructed in accordance with the teachings of this invention.

By way of illustration, the invention is described as applied to a magnetic modulator although other second harmonic modulators may be used as desired. Thus, in the sole figure, a second harmonic magnetic modulator 10 is illustrated as including a first magnetic core 12 and a second magnetic core 14. As is known, each of these magnetic cores 12 and 14 may be constructed of a material having a reasonably high permeability that exhibits a nonlinear, but symmetrical relation between the flux and magnetizing force. The magnetic material may or may not exhibit a hysteresis characteristic. The cores 12 and 14 may be in the form of tape-wound toroids, each having, for example, ten wraps of ¼-millimeter permalog tape on a size 18 ceramic bobbin.

Although any suitable second harmonic magnetic modulator may be employed, a typical modulator 10 is illustrated. Thus, the modulator 10 includes a first excitation winding 16 and a second excitation winding 18 each wound on the respective first and second cores 12 and 14. Each of the first and second cores 12 and 14 also has a signal winding 20 that is common to both cores.

The modulating signal, a low level D.C. input signal, derived from a thermocouple, for example, may be applied to a pair of D.C. input terminals 22. A capacitor 24 is connected across the D.C. input terminals 22. The D.C. input terminals 22 are also connected across the serially connected signal winding 20 of the second harmonic modulator 10 and the primary winding 34 of an untuned transformer 35. The transformer 35 also has a secondary winding 36 which is coupled to the output terminals 32. The output terminals may in turn be connected to the A.C. amplifier (not shown) of an instrument servo, for example. Each of the first and second excitation windings 16 and 18, respectively, are wound about the first and second cores 12 and 14, respectively, such that the flux caused or generated by the modulating signal winding 20, as a result of a D.C. signal applied to the input terminals 22, aids the instantaneous A.C. flux generated in one of the cores, say the first core 12 while opposing the A.C. flux established by the excitation winding 18 in the second core 14. Stated in another manner, the winding direction of the excitation windings 16 and 18 is such as to vary the flux in each of the cores 12 and 14, respectively, in opposite senses. In this way, the resultant flux change in the modulating signal winding 20 due to the fundamental exciting frequency is essentially zero. This serves to filter out the fundamental frequency and prevent it from reaching the output of the modulator 10.

The first excitation winding 16 is paralleled by a variable resistor 40. In like manner, the second excitation winding 18 is connected in parallel with a fixed resistor 42. The second harmonic modulator 10 is connected to be driven by a signal having a substantially rectangular waveform wherein the half cycles of the waveform are of essentially equal time duration and equal amplitude; i.e., a symmetrical rectangular waveform. The prime requirement of the symmetrical rectangular waveform is that it be substantially free of even harmonics. The symmetrical rectangular drive signal is obtained from a rectangular waveform generator 44, illustrated by the dotted rectangle having output terminals 80 and 82, respectively. The symmetrical rectangular drive signal from the output terminals 80 and 82, respectively, is coupled through a transformer 46 having a primary winding 48, which includes a center tap 50 connected to ground, and a secondary winding 52. The terminals of the secondary winding 52 are each connected through respective resistors 54 and 56 to one terminal of each of the first and second excitation windings 16 and 18, respectively, of the second harmonic modulator 10. In turn the remaining terminal of each of these two windings, 16 and 18, are connected together at a common point 58 which common point 58 is connected to ground. A capacitor 60 is conne cted between the one terminal of each of the first and second excitation windings 16 and 18.

A balancing circuit and bias current source 64 includes a pair of serially connected zener diodes 66, a common junction 67 therebetween being connected to ground. A resistor 68, having a variable tap 70 connected to the lower one terminal of the second excitation winding 18, is connected in parallel with the serially connected zener diodes 66. The balancing circuit and bias current source 64 is energized by a positive source of voltage +E and a negative source of voltage —E; each voltage source +E and —E being connected through resistors 74 and 76, respectively, across the tapped resistor 68.

The exciting signal generator 44 may be any suitable source such as a free-running multivibrator, blocking oscillator, etc., that is capable of providing a substantially symmetrical rectangular waveform. By way of illustration only, the details of a suitable circuit that may be employed for the generator 44 is illustrated. The generator illustrated is simply a modification of a conventional transformer coupled D.C. to A.C. converter circuit. Thus, the generator 44 includes a first transistor 84 and a second transistor 86. Each of the transistors 84 and 86 is of a PNP type conductivity transistor. The first transistor 84 includes a collector electrode 88, an emitter electrode 90, and a base electrode 92. In similar manner the second transistor 86 includes a collector electrode 94, an emitter electrode 96, and a base electrode 98. The emitter electrodes 90 and 96 are each connected respectively to a common point 104 which is connected to a positive current source 106, which may for example be a battery (not shown). The collector electrode 88 at the first transistor 84 is connected to the first output terminal 80 and thence to the primary winding 48 of the transformer 46. In similar manner, the collector electrode 94 of the second transistor 86 is connected to the output terminal 82 thence to the other end of the primary winding 48 of the transformer 46.

Further, each of the collector electrodes 88 and 94, respectively, are connected through cross coupling networks 110 and 112, respectively, to the base electrodes 98 and 92, respectively, of the second and first transistors 86 and 84, respectively. Each of the cross coupling networks 110 and 112 includes a parallel connected resistor 114 and capacitor 116.

The symmetrical rectangular exciting signal derived from the signal generator 44 is coupled through the transformer 46 to the second harmonic modulator 10. The exciting signal passes through each of the first and second exciting windings 16 and 18, respectively, to produce a magnetic flux in each of the first and second cores 12 and 14, respectively, in opposite senses with respect to the signal winding 20. In the absence of a D.C. signal in the signal winding 20, since the relation between the flux in the cores 12, 14 and the magnetizing force therefor is a symmetrical one, the opposing fluxes linking the signal winding 20 are equal and opposite and hence induce no voltage therein.

When the axis of symmetry of the cores 12, 14 is disturbed as by an unidirectional input signal, such as is applied to the D.C. input terminals 22, a signal is induced in the signal winding 20 that is a second harmonic of the frequency of the exciting signal derived from the generator 44. The details of this operation are described more fully in the Rote article. If the polarity of the input D.C. signal is reversed, the output second harmonic wave reverses its phase by 180°.

This second harmonic output voltage induced in the signal winding 20 is coupled through the transformer 35 to the output terminals 32. As noted hereinbefore, the output terminals 32 may feed an A.C. amplifier of an instrument servo. The A.C. amplifier may include a band pass filter (not shown) to allow only the second harmonic output signal to pass and filter out any other higher even harmonics. The capacitor 24 coupled across the D.C. input terminals 22 serves as a low impedance path for harmonics and any unwanted A.C. signal that may be present on the input line.

In the prior art, a reasonably pure sign wave excitation current was thought to be required. In accordance with this invention, a symmetrical rectangular wave drive is employed since a relatively pure sign wave is difficult and relatively expensive to obtain. The symmetrical rectangular wave drive is a signal which has a substantially constant odd harmonic content. As will be described hereinafter, it may produce extraneous even harmonics which can be cancelled out. Further, the highest conversion gain that may be obtained from a second harmonic modulator generally occurs when the magnitude of the drive signal is just sufficient to vary the flux in the respective first and second cores 12 and 14 from magnetic saturation in one direction to magnetic saturation in the other direction. This, however, may create an unfavorable operating condition since any slight overload (by the application of too high a voltage to the D.C. input terminals 22) in either direction will unbalance the modulator and recovery may be extremely slow. In accordance with this invention, conversion gain is sacrificed somewhat for zero stability by overdriving the cores.

However, a large amount of overdrive allows the cores to switch quite rapidly and the harmonic content is distributed over many octaves. For this reason a modified voltage drive is used which confines more of the even harmonic energy content to the second harmonic frequency signal and still achieves the desired overdrive. Thus, the symmetrical rectangular wave form drive current signal appearing at the secondary winding 52 of the transformer 46 is limited by the loop resistance of the resistors 54 and 56 which are selected to produce a current value about four times that which allows the cores to be just saturated in each direction. In addition, the normal fast rise time of the drive signal from the generator 44 is decreased by the capacitor 60 which is coupled across the modulator drive winding 52. This causes each of the cores 12 and 14 to become saturated more slowly. However, once the cores 12 and 14 of the modulator 10 begin to saturate, the capacitor 60 discharges through the respective windings 16 and 18 which increases the saturating current flowing through the windings. The effect of this capacitor discharge is to maintain a voltage drive on the modulator cores 12 and 14 even while they are in saturation. This allows a considerable increase in the overdrive current and prevents any "core memory" (due to the cores not being driven fully to saturation in both directions) or unbalance due to large overloads. The value of the capacitor 60 is chosen to cause a delay in saturation of the cores 12 and 14 equal to one half of the period of the second harmonic output signal. This has the same effect on distribution of the harmonic content as reducing the magnitude of the total drive signal to a much lower value.

Since the rise and fall of the drive signal is not infinitely fast and due to circuit imperfections the symmetrical rectangular waveform drive signal may actually have some dissymmetry (often in the order of 1%). There is some second harmonic signal components generated in the signal winding 20 even with a zero input signal at the input terminals 22. This contribution to unwanted second harmonic may be balanced by adjusting the symmetry of the magnetic characteristic of at least one of the cores. In this instance the magnetic characteristic of the second core 14 is adjusted by passing a small amount of current through the excitation winding 18. This current is obtained from the balancing circuit and bias current source 64. Thus a voltage from the sources ±E is regulated by the serially connected zener diodes 66 and by variation of the position of the tap 70 of the variable resistor 68. The current through the second excitation winding 18 is adjusted until the second harmonic appearing in the signal winding 20 is minimized.

Excess odd harmonics appearing in the signal winding 20 that are not rejected by the balanced drive, leads to diffculties in that the stages of the A.C. amplifiers which the magnetic modulator may drive may be saturated thereby. This difficulty may be reduced by matching the cores and may be further reduced by adjusting the amount of drive to each core 12 and 14 of the modulator by variation of the variable resistor 40.

The generator 44 is illustrated as a modified transformer coupled A.C. to D.C. converter. The operation of the conventional converter is speeded up by use of the cross coupling network 110 and 112. This results in faster switching time and in higher efficiency and greater stability of the harmonic contents of the drive signal. Thus, if the first transistor 84 begins to conduct, collector current flow initially meets a relatively high impedance from the primary winding 48 of the transformer 46. This causes the voltage on the collector electrode 88 to rise which passes a positive going signal through the cross coupling network 110 to the base electrode 98 of the second transistor 86 which aids in maintaining the second transistor base to emitter junction 98–96 reversed bias and the transistor cutoff. Current flow through the primary winding 48 continues to increase because of the constant voltage across the inductance, until saturation of transformer 46 is reached. The voltage on the collector electrode 88 of the first transistor 84 then immediately drops in value, which voltage drop is transmitted through the cross coupling network 110 to the base electrode 98 of the second transistor 86. At this instant, the second transistor 86 emitter to base junction 96–98 becomes forward biased and conduction begins in the second transistor. With the occurrence of conduction in the second transistor 86, the cycle repeats itself wherein the first transistor 84 is turned off by the rising (in a positive going direction) voltage on the collector electrode 24 which passes through the second cross coupling network 112 to the base electrode 92 of the first transistor 84. It is thus apparent that first one and then the other of the first and second transistors 84 and 86 are in a state of conduction and then are rapidly switched to a state of non-conduction. The current flow passed by each of these respective transistors is through each half of the primary winding 48 to the grounded center tap 50, whereby the succession of symmetrical rectangular pulses which appear in the secondary winding 52 as a balanced drive current.

Many alternative arrangements of this invention are possible without departing from the scope thereof. For example, the nonlinear, symmetrical elements of the modulator may be any such element.

There has thus been described a novel drive circuit for a second harmonic modulator in which the modulator is driven with signals having essentially a symmetrical rectangular waveform. High efficiency is achieved by using only low power transistors in the drive circuitry. Further, the stability of the harmonic content of the drive signals is easy to maintain and the drive circuit itself may be used without fear of reflected loads destroying the purity of the waveform as in the prior art. Further, the symmetrical rectangular waveform drive allows a relatively high response time with relatively small power dissipation in the driving transistors.

Since many changes could be made in the above construction and many widely different embodiments of this invention could be made without departing from the scope thereof, it is intended that all matter contained in the above description or shown in the accompanying drawing shall be interpreted as illustrative and not in a limiting sense.

I claim:

1. A second harmonic modulator comprising a pair of saturable magnetic cores, an excitation winding for each of said cores, means connecting said windings in opposing series relation, means for applying an excitation signal having an essentially symmetrical rectangular waveform of fundamental frequency *f* to said windings for varying the magnetic flux in each of said cores in opposite senses, means for applying to said windings a direct current bias potential for establishing an equal magnetic flux in each of said cores in opposite senses, a separate winding common to both of said cores, means for applying a modulating signal to said separate winding thereby to magnetically bias each of said cores in the same sense, whereby the power required to drive said modulator is reduced.

2. Apparatus comprising a pair of saturable magnetic cores, an excitation winding for each of said cores, means connecting said windings in opposing series relation, means for applying an excitation signal having a plurality of different frequency component signals including a fundamental signal of frequency *f* and a plurality of harmonic signals that are different odd harmonics of said fundamental signal to said windings for varying the magnetic flux in each of said cores in opposite senses, means for applying to said windings a direct current bias potential for establishing an equal magnetic flux in each of said cores in opposite senses, a separate winding common to both of said cores, means for applying a modulating signal to said separate winding thereby to magnetically bias each of said cores in the same sense, whereby the power required to drive said converter is reduced, and means coupled to said separate winding for deriving a modulated output signal having a frequency 2$f$, whereby fewer odd harmonics of said fundamental signal are present in said output signal.

3. A second harmonic magnetic modulator comprising a pair of saturable magnetic cores, an excitation winding for each of said cores, means connecting said windings in opposing series relation, means for applying an excictation signal having a fundamental frequency $f$ and a substantially symmetrical rectangular waveform to said windings whereby its harmonic content is substantially constant with few even harmonics of said fundamental frequency, means for applying to said windings a direct current bias potential for establishing an equal magnetic flux in each of said cores in opposite senses, a separate winding common to both of said cores, means for applying a modulating signal to said separate winding thereby to magnetically bias each of said cores in the same sense, said excitation signal having an amplitude in excess of that required to magnetically saturate said cores, whereby the power required to drive said modulator is reduced and means coupled to said separate winding for deriving a modulated output signal having a frequency 2$f$, whereby fewer odd harmonics of said fundamental signal are present in said output signal.

4. The combination set forth in claim 3 wherein said applying means also includes means for increasing the time required to saturate said cores with each half cycle of said exciting frequency, whereby the effects of overloading said modulator by said modulating signal are reduced.

5. The combination set forth in claim 3 wherein said applying means also includes means for delaying the saturation of said cores during each half cycle of said excitation frequency for a period of time equal to approximately one-fourth of the period of said excitation frequency, whereby the effects of overloading said modulator by said modulating signal are reduced.

6. The combination set forth in claim 5 which also includes means for magnetically biasing at least one of said cores, whereby any extraneous even harmonics of said fundamental frequency in said excitation signal are cancelled in said means for applying said modulating signal.

7. In a second harmonic magnetic modulator having a pair of saturable magnetic cores, a modulating signal input, an excitation signal input for receiving an excitation input signal of frequency $f$, and an output for providing a modulated output signal of frequency 2$f$, and a direct current bias signal input for reducing odd harmonics of said excitation input signal in said modulator output, the combination of a drive circuit for said modulator coupled to said excitation signal input, said drive circuit includng a source of an excitation signal of frequency $f$ and having a substantially symmetrical rectangular waveform, a capacitor directly connected across said excitation signal input, and means serially connected to said excitation signal input for limiting current flow to said excitation signal input to a value substantally four times that required to saturate said cores whereby the power required to drive said modulator is reduced.

8. The combination set forth in claim 3 which also includes a capacitor connected across said series connected excitation windings thereby to maintain a voltage drive on said excitation windings even when said cores are saturated.

References Cited in the file of this patent

UNITED STATES PATENTS

| | | |
|---|---|---|
| 2,647,253 | Mackenzie et al. | July 28, 1953 |
| 2,790,948 | Wennerberg | Apr. 30, 1957 |
| 2,798,970 | Hall et al. | July 9, 1957 |
| 2,994,840 | Dorsman | Aug. 1, 1961 |